(12) United States Patent　　　　　(10) Patent No.:　　US 12,698,840 B2
Kossmann et al.　　　　　　　　　　　(45) Date of Patent:　　　Aug. 4, 2026

(54) COMBINATION AERATION, DEAERATION, AND WATER OUTLET VALVE AND CLIMATE CHAMBER WITH SUCH COMBINATION AERATION, DEAERATION, AND WATER OUTLET VALVE

(71) Applicant: Binder GmbH, Tuttlingen (DE)

(72) Inventors: Robin Kossmann, Tuttlingen (DE); Philipp Zimmerer, Rottweil (DE); Jochen Buschle, Tuttlingen (DE)

(73) Assignee: Binder GmbH, Tuttlingen (DE)

( * ) Notice: Subject to any disclaimer, the term of this patent is extended or adjusted under 35 U.S.C. 154(b) by 0 days.

(21) Appl. No.: 18/942,120

(22) Filed: Nov. 8, 2024

(65) Prior Publication Data

US 2025/0155037 A1　　May 15, 2025

(30) Foreign Application Priority Data

Nov. 13, 2023　(DE) ..................... 10 2023 131 448.3

(51) Int. Cl.
　　*F16K 11/10*　　　　(2006.01)
　　*F16K 15/04*　　　　(2006.01)
　　*F16K 24/00*　　　　(2006.01)
(52) U.S. Cl.
　　CPC ............ *F16K 11/105* (2013.01); *F16K 15/04* (2013.01); *F16K 24/00* (2013.01)
(58) Field of Classification Search
　　CPC ...... F16K 11/105; F16K 15/042; F16K 17/12; F16K 17/164; F16K 17/22; F16K 17/24;
(Continued)

(56) References Cited

U.S. PATENT DOCUMENTS 1,240,254 A * 9/1917 Prescott et al. ....... F16K 15/042
　　　　　　　　　　　　　　　　　　122/DIG. 15
1,724,878 A * 8/1929 Jensen .................... F16K 17/36
　　　　　　　　　　　　　　　　　　220/745

(Continued)

FOREIGN PATENT DOCUMENTS

DE　　　　3617153 A1　　11/1987
DE　　　　4313776 C1　　10/1994
GB　　　　2479772 A　　　6/2010

OTHER PUBLICATIONS

European Patent Office, "Search Report" issued in European Patent Application No. 24165916.8, dated Jan. 17, 2025; document of 8 pages.

(Continued)

*Primary Examiner* — Reinaldo Sanchez-Medina
(74) *Attorney, Agent, or Firm* — Akerman LLP; Peter A. Chiabotti

(57)　　　　　　ABSTRACT

The combination aeration, deaeration, and water outlet valve includes a common water inlet, gas inlet, and gas outlet for connecting to a climate chamber; a water reservoir connected to the common water inlet, gas inlet, and gas outlet; a first valve assembly with a first valve seat penetrated by a first passage and with a first closing element pressed onto the first valve seat by a first closing force such that it blocks the first passage until the first closing force is overcome; a second valve assembly with a second valve seat penetrated by a second passage and with a second closing element pressed by a second closing force onto the second valve seat such that it blocks the passage until the second closing force has been overcome; and a drainage opening for air and water disposed at a height of an upper edge of the second valve seat.

11 Claims, 5 Drawing Sheets

(58) Field of Classification Search
CPC ........ F16K 17/285; F16K 24/00; F16K 24/02;
F16T 1/12; F16T 1/20; F16T 1/22; F25D
17/047; F25D 21/14; F25D 2321/14;
F24F 13/222; F25B 41/42
See application file for complete search history.

(56) References Cited

U.S. PATENT DOCUMENTS

| | | | |
|---|---|---|---|
| 5,557,942 A * | 9/1996 | Kim | F25D 17/047 |
| | | | 62/291 |
| 6,684,415 B1 * | 2/2004 | Kozono | E03C 1/1225 |
| | | | 137/512 |
| 11,691,900 B2 * | 7/2023 | Park | F24H 8/006 |
| | | | 210/119 |
| 2008/0099083 A1 | 5/2008 | Nishimoto | |
| 2012/0131943 A1 * | 5/2012 | Shin | F25D 21/14 |
| | | | 62/331 |
| 2015/0129050 A1 * | 5/2015 | Yang | F16T 1/14 |
| | | | 137/180 |
| 2015/0314026 A1 | 11/2015 | Mauzerall et al. | |
| 2016/0008503 A1 | 1/2016 | Webb et al. | |
| 2019/0226715 A1 | 7/2019 | Des Champs | |

OTHER PUBLICATIONS

German Patent and Trademark Office, "Office Action" issued in
German Patent Application No. 10 2023 131 448.3, dated Sep. 11,
2024; document of 9 pages.

* cited by examiner

COMBINATION AERATION, DEAERATION, AND WATER OUTLET VALVE AND CLIMATE CHAMBER WITH SUCH COMBINATION AERATION, DEAERATION, AND WATER OUTLET VALVE

CROSS-REFERENCE TO RELATED APPLICATION

The present application claims priority to German Patent Application No. 10 2023 131 448.3, filed Nov. 13, 2023, the entirety of which is incorporated herein by reference.

FIELD OF APPLICATION

The present application relates to climate chambers for storing items at defined temperatures and air humidity by providing a combination aeration, deaeration, and water outlet valve.

BACKGROUND

Climate chambers are a class of laboratory chambers in the interior volume of which defined conditions, in particular in view of temperature and air humidity, can be set and maintained. Accordingly, it is important to be able to insulate the interior volume as well as feasible in order to avoid an undesirable heat exchange with the environment. The inner shell must simultaneously also be well sealed to avoid humidity decreases or water vapor losses.

An important application field for climate chambers is their employment as environment simulation chambers, in material proof tests, in particular in material proof tests in which the response of the material to be tested in reaction to repeated or continually changing operating points, in particular at varying temperatures and varying moisture concentrations, are being investigated. Such changes of environmental conditions, unfortunately, can lead to the necessity of allowing pressure compensation and, if necessary, also enabling the possibility of drainage of accumulating condensation from the interior volume of the climate chamber. This applies even more if through planned or unintentional door openings sudden temperature changes can occur which can trigger an implosion. To provide this feasibility known climate chambers comprise a pressure relief valve and a vacuum valve as well as a condensation drainage. However, the disadvantage entailed in this solution lies therein that it necessitates a multiplicity of connections in the wall or bottom faces that define the interior volume, each of which makes it necessary for each of them to be sealed and which must be retained over a multiplicity of operating cycles in order to avoid heat exchanges and moisture losses during static operation; that is, when no condensate has to be drained and no pressure compensation needs to be effectuated.

SUMMARY

The problem addressed by the application comprises providing a combination aeration, deaeration, and water outlet valve which enables ensuring overpressure as well as underpressure compensation and condensation water management across a single common outlet and providing a climate chamber with such combination aeration, deaeration, and water outlet valve. These problems are resolved through a combination aeration, deaeration, and water outlet valve and through a climate chamber The combination aeration, deaeration, and water outlet valve comprises in particular the following components:

a common water inlet, gas inlet, and gas outlet for the connection to a climate chamber. The conclusion can be drawn therefrom, in particular directly, that at least through parts of the valve, a throughflow of gas, in particular of air, as well as also of water, takes place.

a water reservoir with which the common water inlet, gas inlet, and gas outlet is connected such that water from the common water inlet, gas inlet, and gas outlet entering into the water reservoir is conducted under force of gravity in the direction toward the bottom of the water reservoir.

Accordingly, water, respectively condensate, is introduced through the common water inlet, gas inlet, and gas outlet into the water reservoir and (initially) stored here such that a water level rising in time forms in the water reservoir. This means in particular that the common water inlet, gas inlet, and gas outlet is disposed in the upper region of the water reservoir, preferably at its ceiling or at its upper edge.

Since the force of gravity onto the water is the driving force with which the water is conducted through the combined aeration, deaeration, and water outlet valve, its intended orientation in space is defined and in particular the identification of its bottom and its ceiling as well as of the directions "above" and "below" is clearly possible.

a first valve assembly disposed in a first valve compartment with a first valve seat penetrated by a passage and with a first closure element that is pressed onto the first valve seat by a first closing force such that it blocks this passage until the first closing force has been overcome, wherein the passage is directly or indirectly connected with an air inlet. Such a connection is indirect when a further passage, for example a tube piece, is connected inbetween or when the passage widens again before reaching the air inlet, for example to a compartment.

a second valve assembly disposed in a second valve compartment with a second valve seat that is penetrated by a passage and with a second closing element that is pressed by a second closing force onto the second valve seat such that it blocks this passage until the second closing force is overcome, and a drainage opening for air and water which at the level of the upper edge of the second valve seat leads out of the second valve compartment and establishes a direct or indirect connection between the second valve compartment and an outflow for air and water. This outflow opening can be formed by an opening in the wall of the second valve compartment and preferably leads into a duct or into the drainage reservoir from which in each instance the water, in particular driven by force of gravity, can flow out.

The passage of the second valve seat is herein directly or indirectly connected with the water reservoir such that water collecting at the bottom of the water reservoir can enter into the second passage. This means in particular that the opening through which the water subsequently leaves the water reservoir is located below the second closing element; it is preferably disposed close to the bottom or even directly at the bottom wherein, however, a threshold is acceptable.

Lastly, above the maximum water level of the water collecting in the water reservoir a connection is provided between the water reservoir and the first valve compartment. The maximum water level for a given aeration, deaeration, and water outlet valve is determined by the height of the water column in the water reservoir at which its pressure overcomes the second closing force such that the second closing element opens. This connection is preferably located above the first and/or the second closing element; it extends especially preferably close to the ceiling, especially bordering on the ceiling of the water reservoir.

An especially sensitive response characteristic, and therewith especially good pressure compensation, is attained with a variant of the combination aeration, deaeration, and water outlet valve in which the first closing force and/or the second closing force are provided by gravity. Through the adaptation of the density of the first and/or the second closing element, which can be obtained by the selection of the material of which the particular closing element is fabricated, the response characteristic can be further influenced; it has been found to be favorable for the density of the first and/or the second closing element to be less than the density of water.

An especially cost-effectively producible variant of the combination aeration, deaeration, and water outlet valve is obtained if the water reservoir, the first valve compartment, the second valve compartment, and the drainage reservoir are realized as an integral injection-molded part.

If on the combination aeration, deaeration, and water outlet valve according to a preferred embodiment, on the common water inlet, gas inlet, and gas outlet is disposed a hose fitting on the drainage reservoir or if the common water inlet, gas inlet, and gas outlet and/or the drainage reservoir is formed by a hose fitting, then it can be especially easily connected.

An advantageous further development of the application provides that the first closing element and the second closing element move in the same direction, in particular upwardly, when the respective closing force has been overcome.

The combination aeration, deaeration, and water outlet valve can be implemented especially simply if the first closing element and the second closing element are each formed by a sphere. Dimensions and material of the spheres can, in particular, also be selected to be identical. It can, moreover, contribute to a compact structure if both closing elements are disposed at the same height.

It can also contribute to a simple and cost-effective embodiment if the first valve seat and/or the second valve seat are formed by a section of a planar separation wall with a circular cylindrical opening penetrating the horizontal separation wall, wherein the cylinder axis of the circular cylindrical opening is perpendicular to the plane of the separation wall. Such structures can be simply produced in particular by employing injection molding methods.

Further contribution to a compact structure of the combination aeration, deaeration, and water outlet valve can be made if the water reservoir and the first valve compartment are separated from one another by a partition wall and if the connection between the water reservoir and the first valve compartment is formed by an opening in the partition wall which is located above the first closing element, and/or if the water reservoir and the second valve compartment are separated from one another by a partition wall and if the connection between the water reservoir and the passage of the second valve seat is formed by an opening in the partition wall, which is located below the second closing element.

The air inlet is preferably located above the level of the bottom of the combination aeration, deaeration, and water outlet valve. Particularly when in the interior of the climate chamber a very warm and humid climate obtains, it may happen that in the first valve\ compartment moisture condenses out. When the first closing element opens it may occur that condensate escapes through the passage through the first valve seat. With an air inlet disposed in the bottom, this leads to the condensate forming drops that drip out. If, in contrast, the air inlet is located above the level of the bottom, for example in an outer wall or ceiling of the combination aeration, deaeration, and water outlet valve, such can be prevented. The accumulated quantities of condensate are typically so small, that such can then evaporate.

The climate chamber according to the application has an interior volume delimited by inner walls which is accessible through a door, wherein one of the inner walls forms the bottom of the interior volume and one of the inner walls forms the ceiling. It is distinguished thereby that at the bottom of the interior volume a common connection, preferably precisely one connection, is provided for aeration, deaeration, and water outlet, and that an above described combination aeration, deaeration, and water outlet valve according to the application is connected to this connection.

In the following the application will be described in greater detail in conjunction with Figures representing embodiment examples. Therein depict:

BRIEF DESCRIPTION OF THE DRAWINGS

In the following identical reference symbols are used for identical embodiments; however to improve clarity not all reference symbols are necessarily entered in all representations.

As already discussed above, the force of gravity onto the water is the driving force with which the water is conducted through the combination aeration, deaeration, and water outlet valve such that its intended orientation in space is defined and, in particular, identification of its bottom, its height, its ceiling as well as the directions "above" and "below" is clearly possible.

DETAILED DESCRIPTION

Figures 1, 2A:
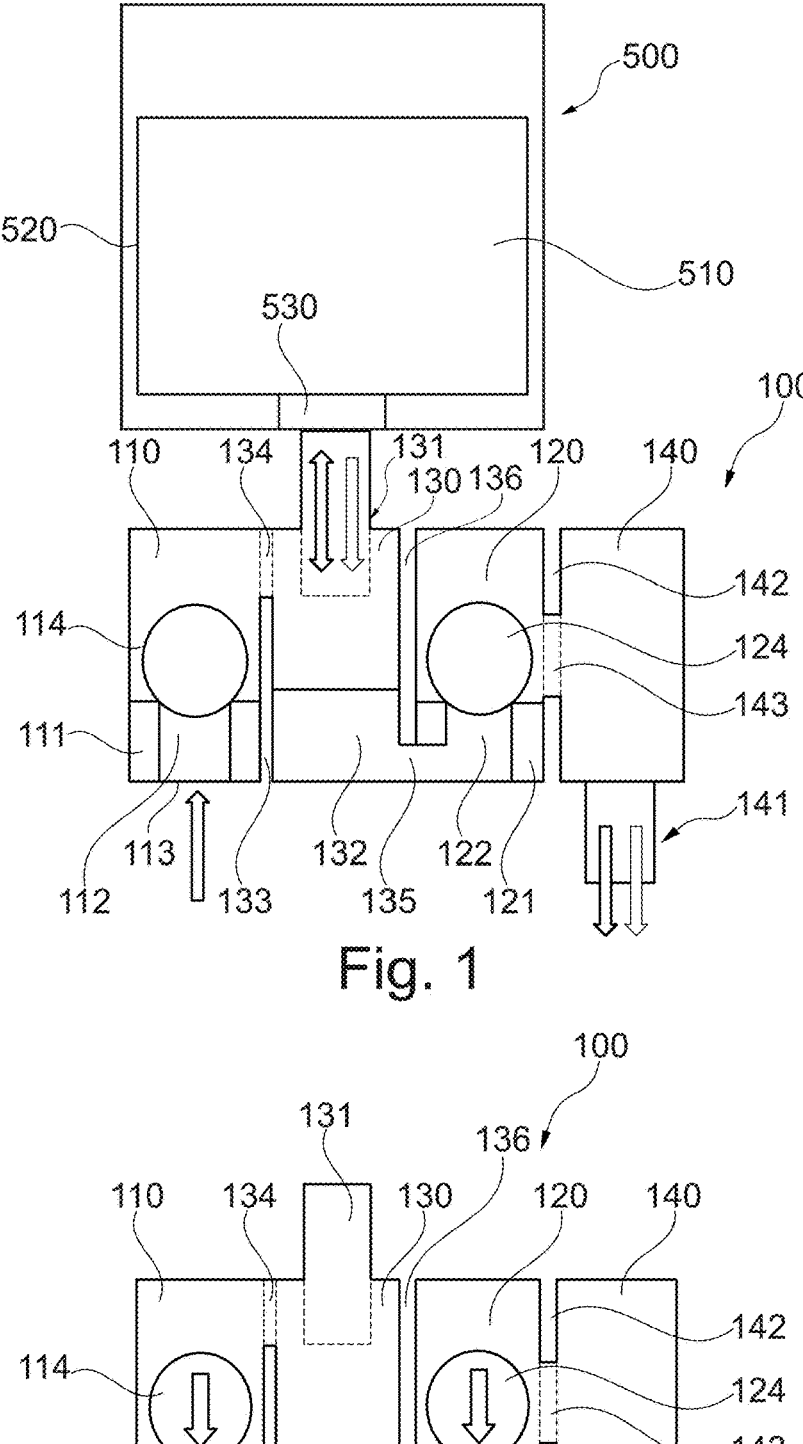
FIG. 1: a first embodiment example of a combination aeration, deaeration, and water outlet valve.
FIG. 2a: the state of the combination aeration, deaeration, and water outlet valve of FIG. 1 in equilibrium.

FIG. 1 shows a first embodiment example of a combination aeration, deaeration, and water outlet valve 100 with first valve compartment 110, second valve compartment 120, water reservoir 130, and drainage reservoir 140.

In the first valve compartment 110 is provided a first valve seat 111 with a first passage 112, which directly leads to an air inlet 113. On the first valve seat 111 rests a first closing element 114, realized as a sphere, which is pressed onto the first valve seat 111 by force of gravity acting as the closing force.

Adjacent to the first valve compartment 110 is located a water reservoir 130 whose ceiling is penetrated by a common water inlet, gas inlet, and gas outlet 31, implemented as a hose fitting, for the connection to a climate chamber 500. At the bottom of the water reservoir 130 water 132 accumulates which reaches the water reservoir 130 through the common water inlet, gas inlet, and gas outlet 131.

The climate chamber 500 has an interior volume delimited by inner walls 510 which is accessible through a door 520, wherein one of the inner walls 510 forms the bottom of the interior volume and one of the inner walls 510 forms the ceiling. At the bottom of the interior volume a common connection 530, such as one connection, is provided for aeration, deaeration, and water outlet, and that an above described combination aeration, deaeration, and water outlet valve is connected to this connection 530.

In the embodiment example depicted in FIG. 1 the first valve compartment 110 is separated from the water reservoir 130 by a partition wall 133, wherein, however, a connection is formed between the water reservoir 130 and the first valve compartment 110 by an opening 134 in the partition wall 133, which is located above the maximum water level of the water reservoir 130, and in the depicted example also above the first closing element 114, and even borders directly on the ceiling.

Adjacent to the water reservoir 130 is located a second valve compartment 120, in which a second valve seat 121 with a second passage 122 is disposed. On the second valve seat 121 rests a second closing element 124, realized as a sphere, which under force of gravity, acting as the closing force, is pressed onto the second valve seat 121.

The passage 122 of the second valve seat 121 in this embodiment example is connected directly with the water reservoir 130, specifically through an opening 135 in the partition wall 136 which separates the water reservoir 130 and the second valve compartment 120 from one another such that the water 132 collecting at the bottom of the water reservoir 130 can enter into the passage 122. The opening 135, through which the water 132 can subsequently leave the water reservoir 130, is located below the level at which the second closing element 124 is located; in particular, it is also close to the bottom and here even directly at the bottom of the water reservoir 130, wherein however a threshold may also be provided.

Further discernible adjacent to the second valve compartment 120 is a drainage reservoir 140 from which the water, in particular driven by force of gravity, but also air, can flow out through an outflow 141 for air and water realized as a hose fitting. In the partition wall 142 between the second valve compartment 120 and the further drainage reservoir 140 is arranged a drainage opening 143 for air and water, which leads out of the second valve compartment 120 at the height of the upper edge of the second valve seat 121 and establishes an indirect connection via the further drainage reservoir 140 between the second valve compartment 120 and the outflow 141 for air and water, which outflow 141 is realized as a hose fitting.

FIG. 2a shows the state of the combination aeration, deaeration, and water outlet valve 100 in equilibrium. Onto the first closing element 114 and the second closing element 124 gravity acts as the closing force and prevents fluids from passing through.

Figure 2B:
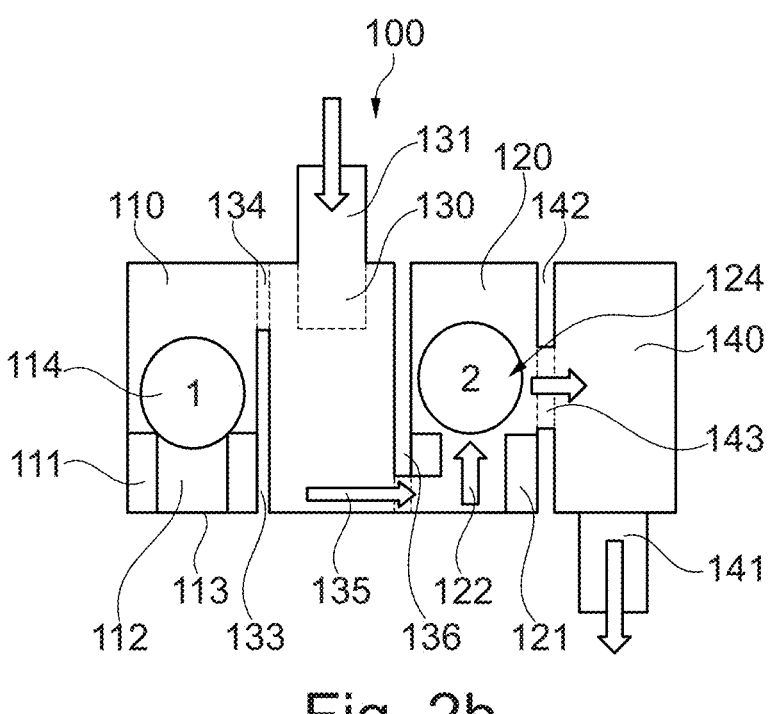
FIG. 2b: the state of the combination aeration, deaeration, and water outlet valve of FIG. 1 when overpressure is applied on the common water inlet, gas inlet, and gas outlet.

FIG. 2b shows the state of the combination aeration, deaeration, and water outlet valve 100 when on the common water inlet, gas inlet, and gas outlet 131 an overpressure symbolized by the arrow is applied. This overpressure augments the closing force acting onto the first closing element 114, but it acts, as illustrated by further arrows, against the closing force acting onto the second closing element 124 and overcomes it if the overpressure is high enough such that the second closing element 124, implemented as a sphere, is lifted from the valve seat 121 and air can flow through the drainage opening 143 into the further drainage reservoir 140 from where it flows off through outflow 141.

It should be noted that this principle functions in nearly identical manner if, as shown in FIG. 1, water is present in the bottom region of the water reservoir 130 and of the passage 122 of the second valve seat 121. The sole difference is that it may occur that the pressure compensation taking place through the inflow of air through the common water inlet, gas inlet, and gas outlet 131 takes place thereby that water 132 is pushed out of the passage 122 of the second valve seat 121 and, after the opening of the second closing element 124, flows across the drainage opening 143 into the further drainage reservoir 140 from which it flows out through the outflow 141.

Figure 2C:
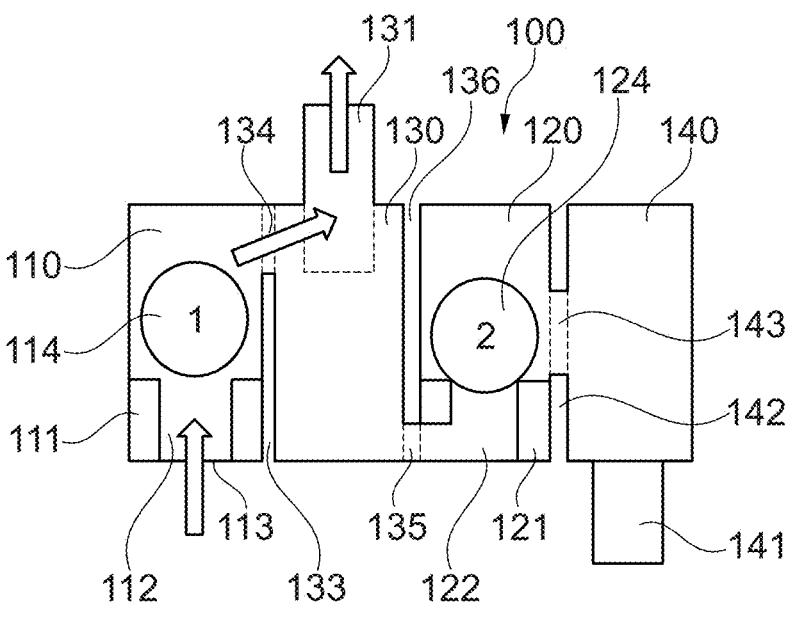
FIG. 2c: the state of the combination aeration, deaeration, and water outlet valve of FIG. 1 when underpressure is applied on the common water inlet, gas inlet, and gas outlet.

FIG. 2c shows the state of the combination aeration, deaeration, and water outlet valve 100 of FIG. 1 when on the common water inlet, gas inlet, and gas outlet 131 an underpressure is applied as is symbolized by the upward arrow. This underpressure augments the closing pressure that acts onto the second closing element 124, however acts against the closing force that is applied onto first closing element 114 and lifts the first closing element 114 off the first valve seat 111 such that environmental air can flow in through the air inlet 113 and the passage 112 and can compensate the underpressure whereby the closing element 114 subsequently sinks again.

Figure 2D:
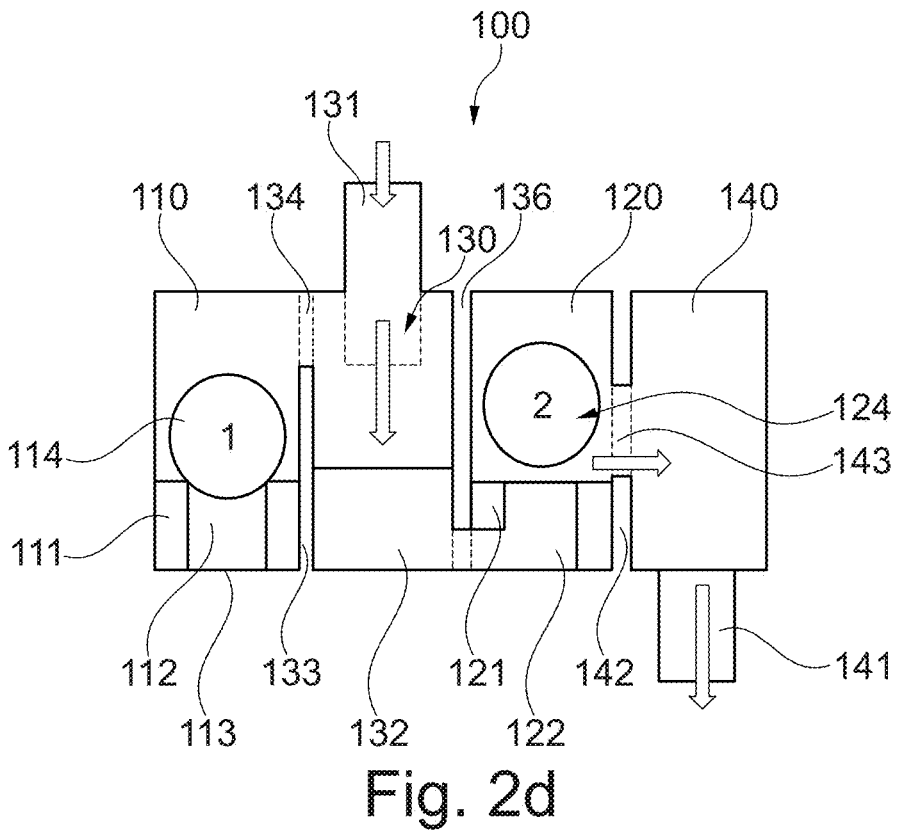
FIG. 2d: the state of the combination aeration, deaeration, and water outlet valve of FIG. 1 when the water outlet is activated.

FIG. 2d lastly shows the state of the combination aeration, deaeration, and water outlet valve 100 of FIG. 1, when further water flows through the common water inlet, gas inlet, and gas outlet 131 into the water reservoir 130, such that the water outlet is activated. The further inflowing water raises the water level of the water 132 at the bottom of the water reservoir 130 and therewith raises the pressure, generated by the water column, onto the bottom of the second closing element 124 until it finally overcomes the closing force provided by force of gravity and lifts the second closing element 124 from the second valve seat 121 such that in this manner water flows across the drainage opening 143 into the further drainage reservoir 140, from which it flows out of it through the outflow 141, whereby the water level of water 132 in the water reservoir 130 decreases such that the closing element 124 sinks again.

Figure 3:
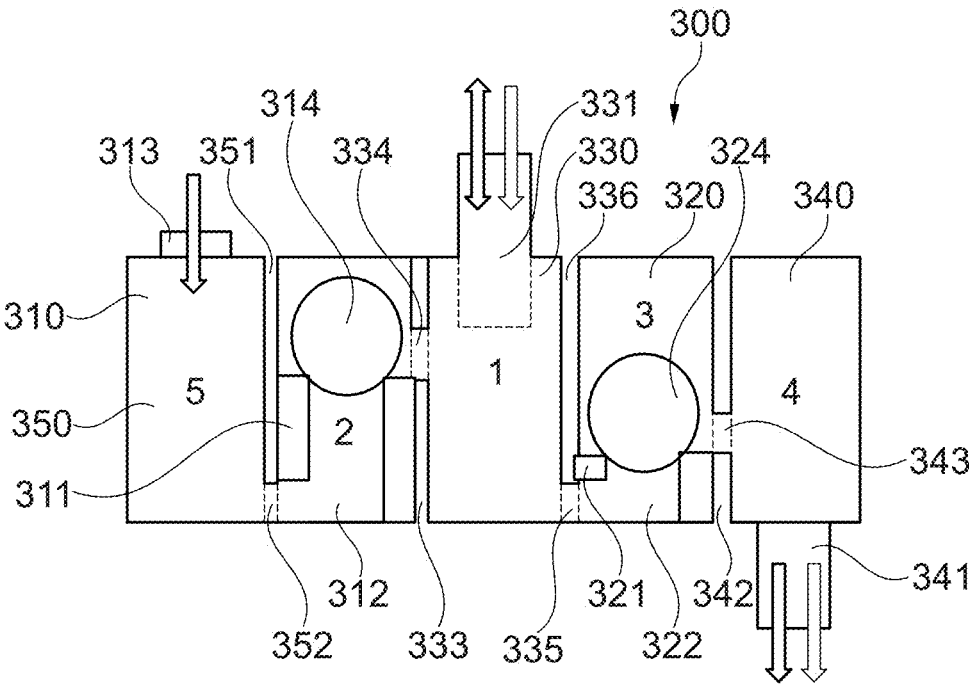
FIG. 3: a second embodiment example of a combination aeration, deaeration, and water outlet valve.

FIG. 3 shows a second embodiment example of a combination aeration, deaeration, and water outlet valve 300 with:

a first valve compartment 310 in which a first valve seat 311 with a first passage 312, through an air inlet reservoir 350, which through a partition wall 351, is delimited from the first valve compartment 310, indirectly leads to an air inlet 313 provided at the ceiling of the combination aeration, deaeration, and water outlet valve 300, and a first closing element 314 realized as a sphere, which through force of gravity acting as the closing force, is pressed onto the first valve seat 311, > a water reservoir 330, whose ceiling is penetrated by a common water inlet, gas inlet, and gas outlet 331, implemented as a hose fitting, for the connection to a climate chamber,
>
> a second valve compartment 320 in which a second valve seat 321 with a second passage 322 is disposed, wherein on the second valve seat 321 rests a second closing element 324, realized as a sphere, which is pressed by force of gravity acting as the closing force onto the second valve seat 321, and
>
> a further drainage reservoir 340 from which the water, in particular driven by force of gravity, but also air can flow out through an outflow 341, realized as a hose fitting, for air and water.

First valve compartment 310, water reservoir 330, second valve compartment 320, drainage reservoir 340, and air inlet reservoir 350 are herein in each instance separated from one another by partition walls 333, 336, 342, 351 in which to create the necessary connections openings 334, 335, 352 or the drainage opening 343 are provided.

The difference in FIG. 3 from the combination aeration, deaeration, and water outlet valve 100 of FIGS. 1 and 2a to 2d is only the additional air inlet reservoir 350 which enables disposing the air inlet 313 above the level of the bottom of the combination aeration, deaeration, and water outlet valve 300 and in this way preventing the emission of condensate from the air inlet 313. The structure and function are otherwise identical such that for further details and for the description of the operating mode reference can be made to FIGS. 1 and 2a to 2d, wherein the reference symbols must each be increased by two hundred in order to transfer the description to FIG. 3.

Figure 4A:
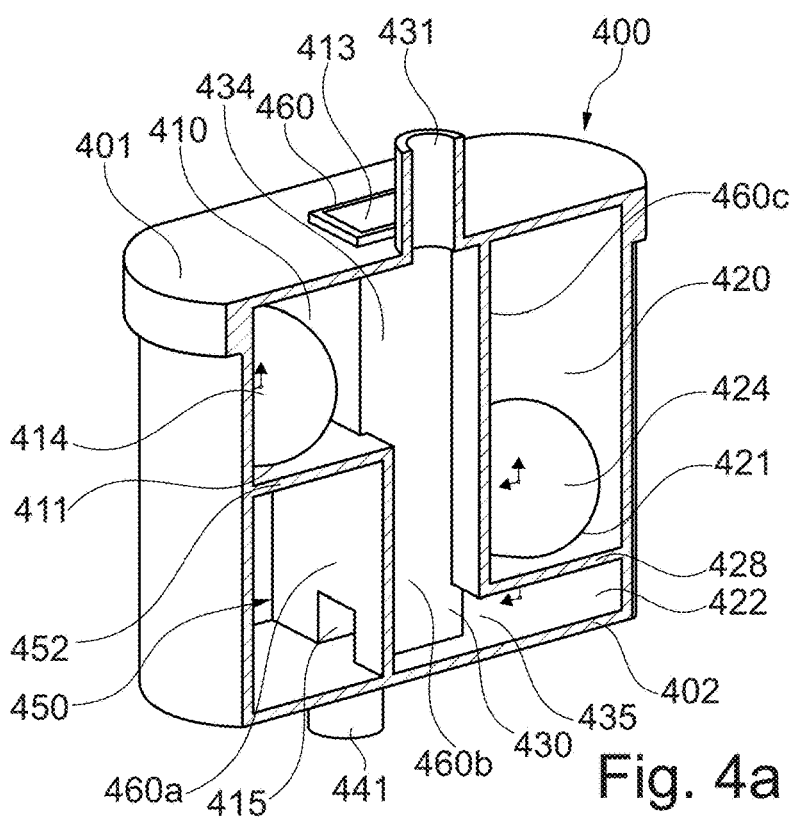
FIG. 4a: a first longitudinal section through a first embodiment of a combination aeration, deaeration, and water outlet valve realized as an injection molded part.
Figure 4B:
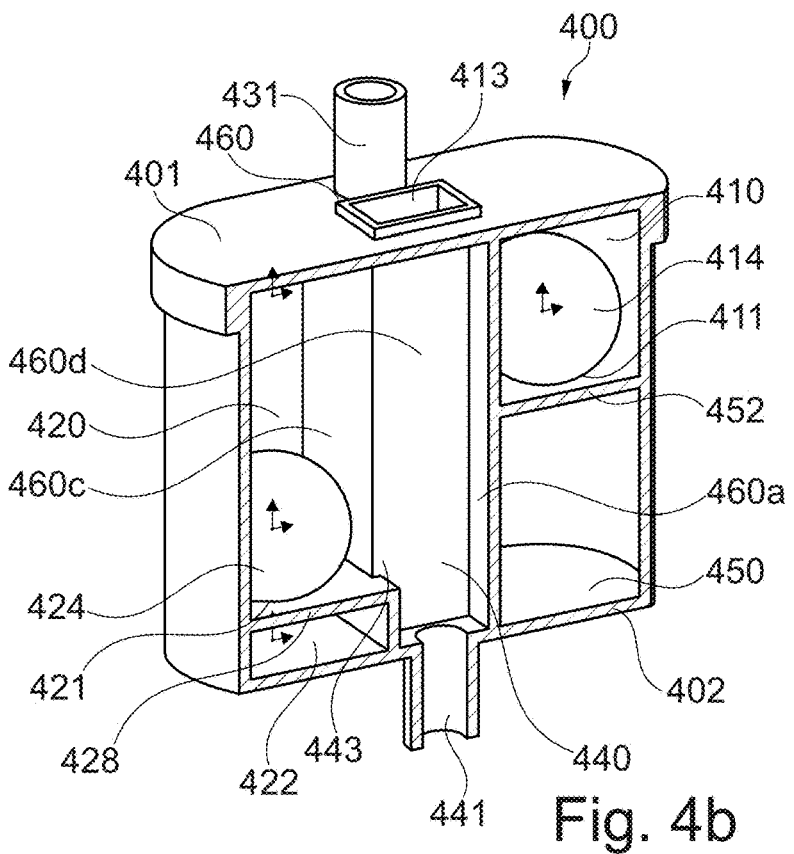
FIG. 4b: a second longitudinal section through the first embodiment of a combination aeration, deaeration, and water outlet valve of FIG. 4a realized as an injection molded part.

FIGS. 4a and 4b show, respectively, two longitudinal sections through a first embodiment, realized as an injection molded part, of a combination aeration, deaeration, and water outlet valve 400, in each of which one of the two opposing longitudinal walls has been removed such that the combination aeration, deaeration, and water outlet valve 400 is represented in each case with reduced width in the transverse direction extending perpendicular to the height and to the longitudinal direction, and a view is possible onto the interior structure of the combination aeration, deaeration, and water outlet valve 400.

In the combination aeration, deaeration, and water outlet valve 400 the air inlet 413 is formed by a centrally disposed shaft 460 with shaft walls 460a, 460b, 460c, 460d which together define a rectangular cross section.

It should here be noted that the shaft walls 460a and 460c, disposed in the transverse direction, are extended beyond, with the exception of the regions of the openings 434, 435 and 443, formed in this way, up to the longitudinal walls of the combination aeration, deaeration, and water outlet valve 400, and thereby form partition walls between different compartments of the combination aeration, deaeration, and water outlet valve 400.

Starting from the ceiling 401 the shaft extends up to the bottom 402 of water outlet valve 400 of the combination aeration, deaeration, and water outlet valve 400 and communicates through an opening 415, disposed in the proximity of the bottom 402 with an air inlet reservoir 450. The ceiling of separation wall 452 of the air inlet reservoir 450 comprises a circular cylindrical opening as a passage which simultaneously serves as a valve seat 411 for the first closing element 414 by which the air inlet reservoir 450 and the first valve compartment 410 are separated from one another.

As already stated, in the proximity of the bottom of the air inlet reservoir 450 the wall of the shaft 460a, in which the opening 415 is disposed, extended up to the side walls of the combination aeration, deaeration, and water outlet valve 400 and connected therewith. In contrast, as the integrated view of FIGS. 4a and 4b shows, this wall of the shaft 460 in the proximity of the first valve compartment 410 is only extended up to one of the side walls of the combination aeration, deaeration, and water outlet valve 400, and connected therewith such that an opening 434 is generated which establishes a connection to the water reservoir 430.

On the side facing the viewer in FIG. 4a the water reservoir 430 borders on the shaft 460 such that its back wall is formed by the shaft 460, more precisely the shaft wall 460b and its side walls are formed by the extended, up to the longitudinal wall that is removed in FIGS. 4a, sections of the shaft walls 460a and 460c.

In the proximity of the ceiling of the water reservoir 430 a common water inlet, gas inlet, and gas outlet 431 is provided that is implemented as a hose fitting. When underpressure obtains in the climate chamber, this is also the case in the first valve compartment 410 due to the connection across the water reservoir 430 and the opening 434. Due to the pressure difference with respect to the ambient pressure which obtains in the air inlet reservoir 450, connected across the shaft 460 and the opening(s) 415 and 435 with the outside, the first closing element 421 and 414 opens and pressure compensation is brought about.

Water that enters into the water reservoir 430 through this common water inlet, gas inlet, and gas outlet 431 collects at its bottom and spreads through the opening 435 into the passage 422. Above the passage 422 extends the separation wall 428 in which an opening forms the second valve seat 421 on which rests the second closing element 424 which in the closed state separates the passage 422 from the second valve compartment 420. If the water level in the water reservoir 430 rises, or at overpressure in the climate chamber, the air pressure in the water reservoir 430, sufficiently strongly, the force of gravity pressing the second closing element 424 onto the second valve seat 421 is overcome, the second closing element 424 opens and water and/or air reaches the second valve compartment 420 until the pressure is again decreased so far that the second closing element 424 closes again.

The second valve compartment 420 is connected across the opening 443, that extends from the ceiling to the height of the separation wall 428, with the further drainage reservoir 440 whose walls are formed by the sections extended in the direction toward the longitudinal wall, not shown in FIG. 4b, of the combination aeration, deaeration, and water outlet valve 400, of the shaft sides 460a and 460c, by this longitudinal wall itself and the shaft side 460d. Since the opening 443 extends up to the height of the separation wall 428, the water entering into the second valve compartment 420 can flow directly into the further drainage reservoir 440 from which it flows off through the outflow 441 for air and water implemented as a hose fitting.

Figure 5:
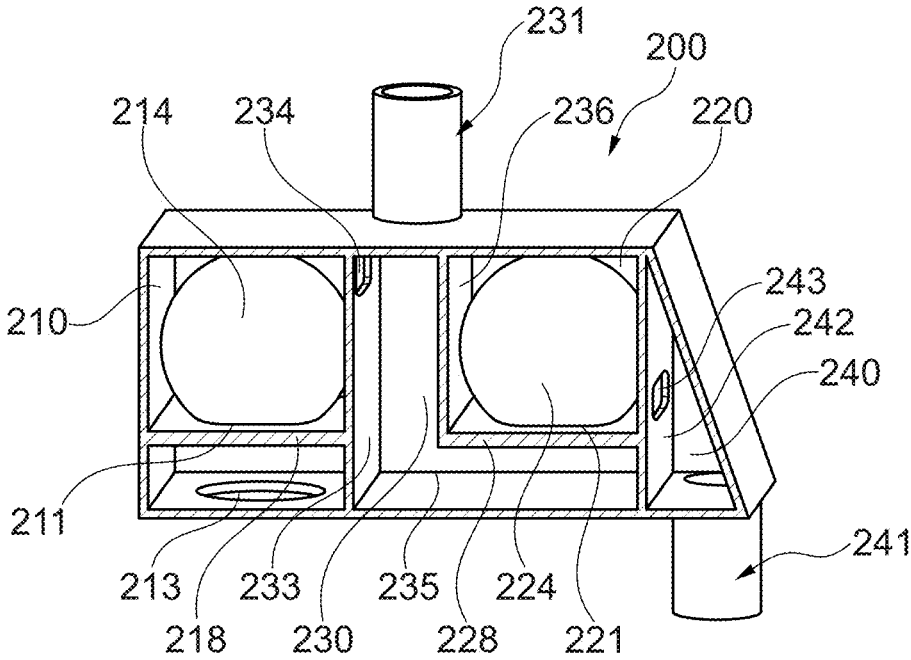
FIG. 5: an embodiment of a combination aeration, deaeration, and water outlet valve realized as an injection molded part.

The combination aeration, deaeration, and water outlet valve 400 according to FIGS. 4a and 4b can obviously very simply be realized by a housing, with partition walls inserted therein and openings, which is very simply producible employing injection molding methods. FIG. 5 shows a second embodiment, realized employing injection molding methods, of a combination aeration, deaeration, and water outlet valve 200 with:

A first valve compartment 210, in which a first valve seat 211 with a first passage, not discernible in FIG. 5, leads indirectly to an air inlet 213, and a first closing element 214, realized as a sphere, which is pressed onto the first valve seat 211 by force of gravity acting as the closing force, a water reservoir 230 whose ceiling is penetrated by a common water inlet, gas inlet, and gas outlet 231, implemented as a hose fitting, for the connection to a climate chamber, a second valve compartment 220 in which a second valve seat 221 with a second passage is disposed which is not discernible in FIG. 5, wherein a second closing element 224, realized as a sphere, rests which is pressed onto the second valve seat 221 by force of gravity acting as the closing force, and a further drainage reservoir 240, from which the water, in particular driven by the force of gravity, but also air can flow off through an outflow 241, realized as a hose fitting, for air and water.

First valve compartment 210, water reservoir 230, second valve compartment 220 and drainage reservoir 240 are herein separated from one another by partition walls 233, 236, 242 in which partition openings 234, 235, respectively drainage opening 243, are provided to create the necessary connections.

The combination aeration, deaeration, and water outlet valve 200 according to FIG. 5 is further distinguished thereby that the first valve seat 211 and the second valve seat 221 are formed by a section of a planar separation wall 218, 228 with a circular cylindrical opening penetrating the separation wall 218, 228, whose cylinder axis is oriented perpendicularly to the plane of the separation wall 218, 228.

This shows that the combination aeration, deaeration, and water outlet valve 200 according to FIG. 5 can also very simply be realized through a housing with separation walls inserted therein, and openings, which realization is very simple of production utilizing injection molding methods.

LIST OF REFERENCE SYMBOLS

100, 200, 300, 400 Combination aeration, deaeration, and water outlet valve
110, 210, 310, 410 First valve compartment
111, 211, 311, 411 First valve seat
112, 312 Passage
113, 213, 313, 413 Air inlet
114, 214, 314, 414 First closing element
120, 220, 320, 420 Second valve compartment
121, 221, 321, 421 Second valve seat
122, 322, 422 Passage
124, 224, 324, 424 Second closing element
130, 230, 330, 430 Water reservoir
131, 231, 331, 431 Common water inlet, gas inlet, and gas outlet
132 Water
133, 233, 333 Partition wall
134, 234, 334, 434 Opening
135, 235, 335, 435 Opening
136, 236, 336 Partition wall
140, 240, 340, 440 Drainage reservoir
141, 241, 341, 441 Outflow for air and water
142, 242 Partition wall
143, 243, 343, 443 Drainage opening
218, 228, 428, 452 Separation wall (with bottom/ceiling)
460a, 460b, 460c, 460d Shaft wall

What is claimed:

1. A combination aeration, deaeration, and water outlet valve, the valve comprising:
   a common water inlet, gas inlet, and gas outlet for connecting to a climate chamber,
   a water reservoir connected to the common water inlet, gas inlet, and gas outlet, wherein the water reservoir is connected such that water entering from the common water inlet, gas inlet, and gas outlet into the water reservoir is conducted under force of gravity in a direction towards a bottom of the water reservoir,
   a first valve assembly, disposed in a first valve compartment, with a first valve seat penetrated by a first passage and with a first closing element pressed by a first closing force onto the first valve seat such that it blocks the first passage until the first closing force is overcome, wherein the first passage leads directly or indirectly from the first closing element to an air inlet,
   a second valve assembly, disposed in a second valve compartment, with a second valve seat penetrated by a second passage and with a second closing element pressed by a second closing force onto the second valve seat such that it blocks the second passage until the second closing force has been overcome, and
   a drainage opening for air and water, disposed at a height of an upper edge of the second valve seat, wherein the drainage opening forms a direct or indirect connection between the second valve compartment and an outflow for air and water, wherein the second passage of the second valve seat is directly or indirectly connected with the water reservoir such that water collecting at the bottom of the water reservoir can enter into the second passage, and
   wherein a direct or indirect connection is provided between the water reservoir and the first valve compartment above a maximum water level of the water collecting in the water reservoir.

2. The valve of claim 1, wherein the first and/or the second closing force is provided by the force of gravity.

3. The valve of claim 2, wherein the water reservoir, the first valve compartment, the second valve compartment and a drainage reservoir are formed as a single, integral injection molded part.

4. The valve of claim 3, wherein on the common water inlet, gas inlet, and gas outlet and/or on the drainage reservoir a hose fitting is disposed or that the common water inlet, gas inlet, and gas outlet and/or the drainage reservoir is formed by a hose fitting.

5. The valve of claim 4, wherein the first closing element and the second closing element move in the same direction after the respective closing force has been overcome.

6. The valve of claim 5, wherein the first closing element and the second closing element are each formed by a sphere.

7. The valve of claim 6, wherein the first valve seat and/or the second valve seat are formed by a section of a planar separation wall with a circular cylindrical opening penetrating the separation wall, wherein the cylinder axis of the circular cylindrical opening is oriented perpendicularly to a plane of the separation wall.

8. The valve of claim 7, wherein the water reservoir and the first valve compartment are separated from one another by a partition wall and wherein the connection between the water reservoir and the first valve compartment is formed by an opening in the partition wall that is located above a height of the first closing element.

9. The valve of claim 8, wherein the water reservoir and the second valve compartment are separated from one another by a partition wall and wherein the connection between the water reservoir and the passage of the second valve seat is formed by an opening in the partition wall which is located below the height of the second closing element.

10. The valve of claim 9, wherein the air inlet is located above the level of the bottom.

11. The valve of claim 1, wherein the climate chamber further comprises:

an interior volume delimited by inner walls which is accessible through a door, wherein one of the inner walls forms a bottom of the interior volume and one of the inner walls forms a ceiling of the interior volume; and wherein the common water inlet, gas inlet, and gas outlet for connecting to a climate chamber is provided at the bottom of the interior volume.

\* \* \* \* \*